3,356,383
HANDLE PROPELLED CART
Eugene A. Sneed, Pontotoc, Miss. 38863
Filed Jan. 27, 1967, Ser. No. 624,112
7 Claims. (Cl. 280—47.26)

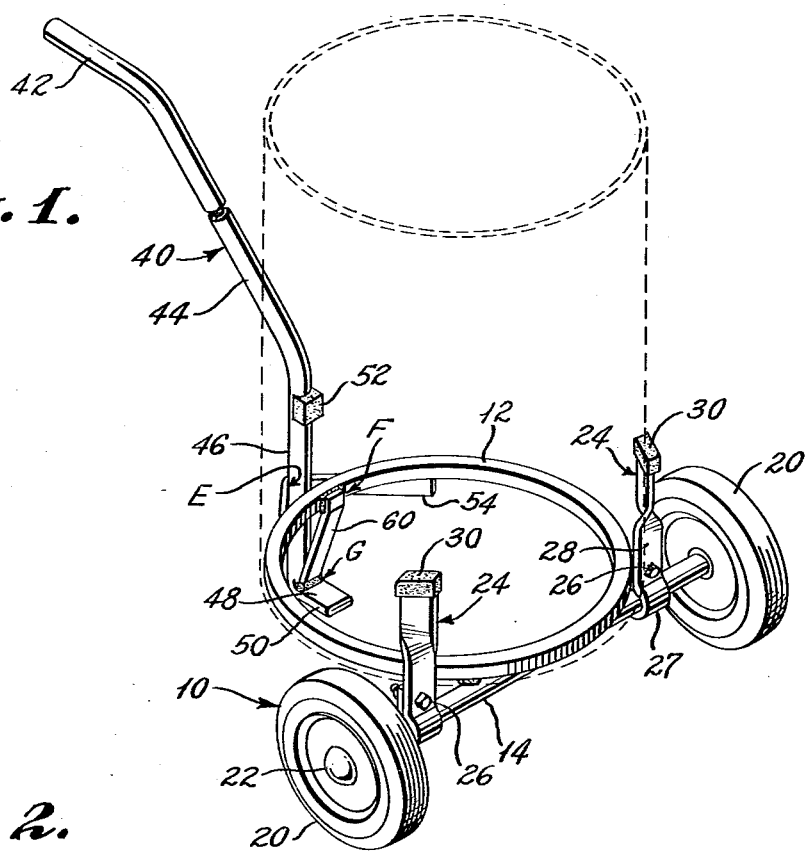

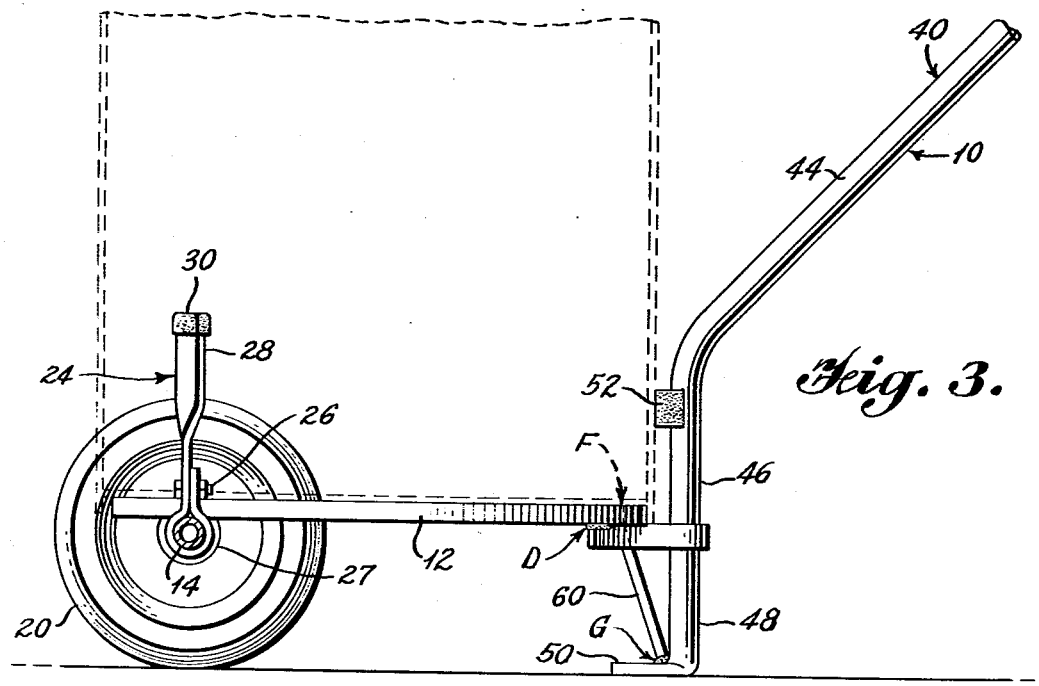
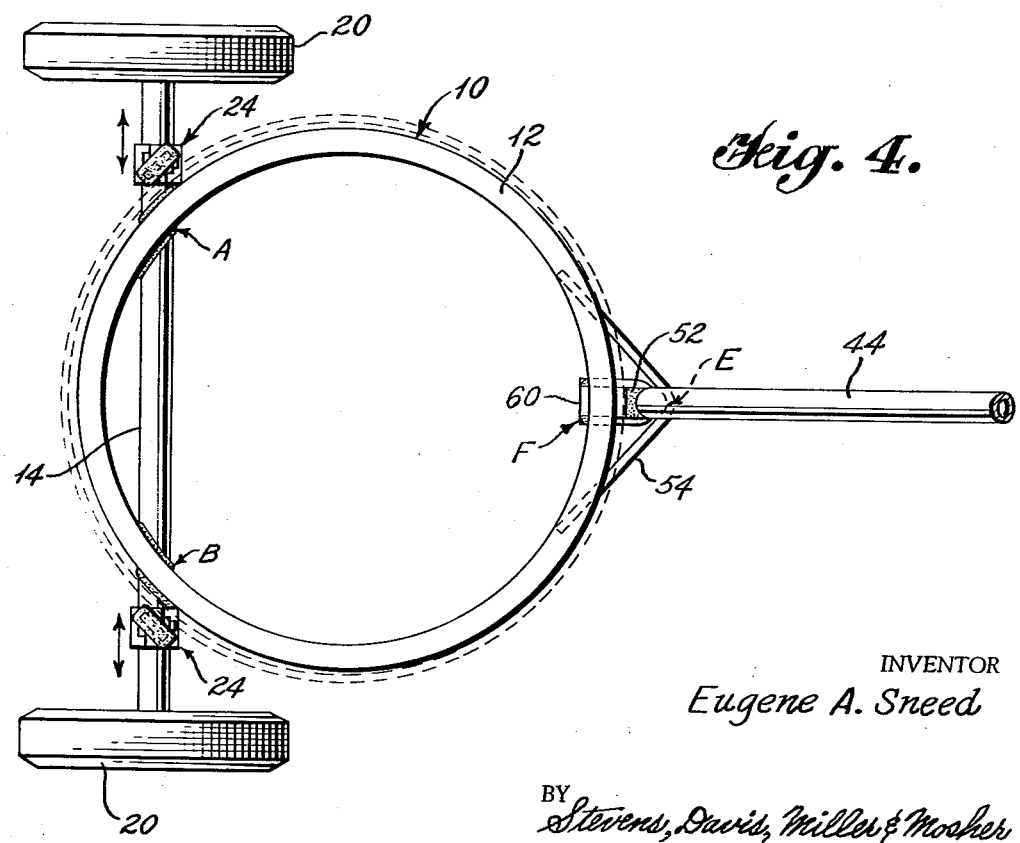

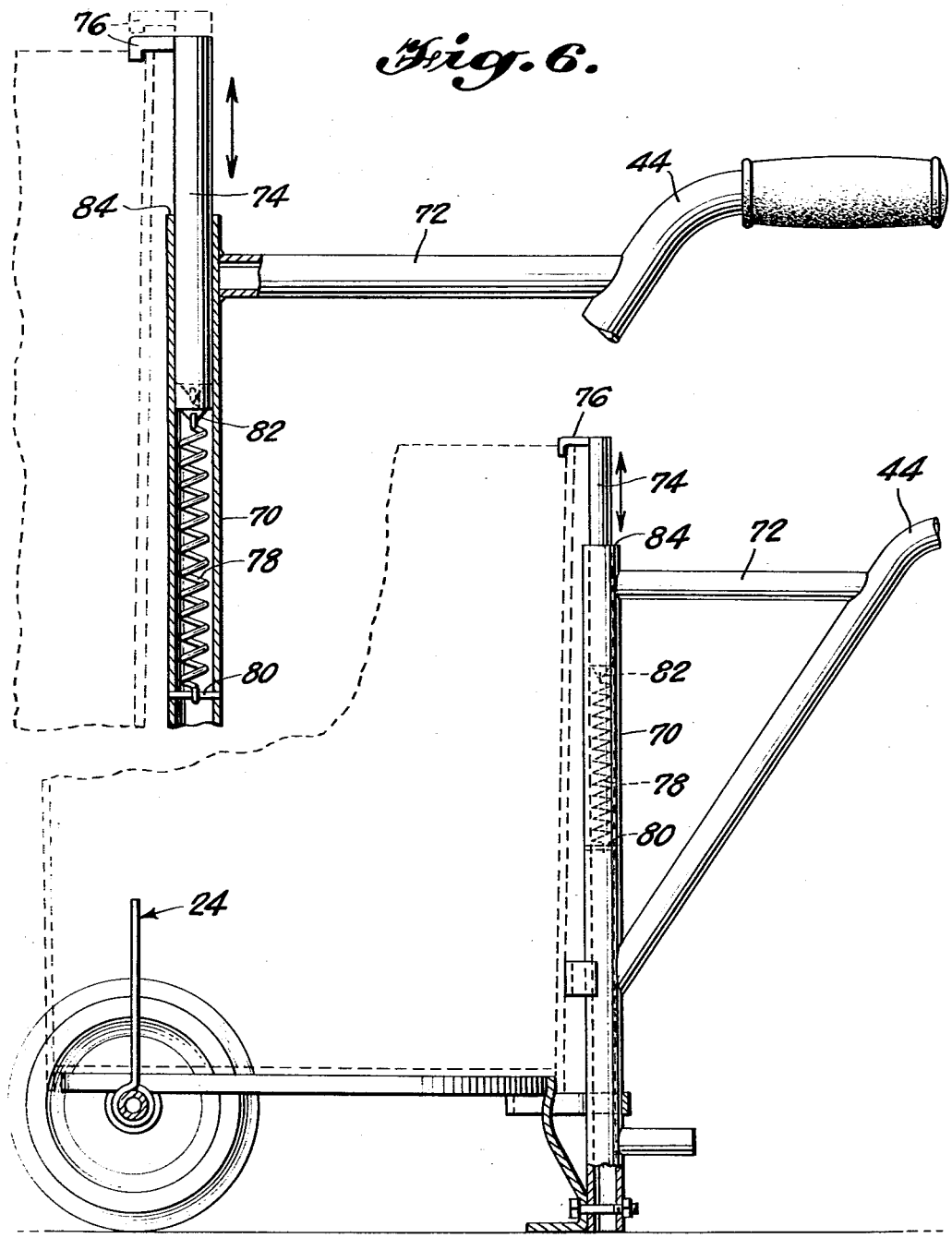

ABSTRACT OF THE DISCLOSURE

A hand propelled cart with an axle supported platform shaped to support the bottom of a drum or can, the bottom lip of which depends below the top platform plane for unidirectional lateral stability, and a pair of upstanding braces on the axle restraining relative container movement in other lateral directions.

Reference to other applications

This application is a continuation in part of application Ser. No. 433,583, filed Feb. 18, 1965, now abandoned.

Background

The present invention relates to push or pull carts and more particularly cart-type carriers adapted to carry round garbage cans, drums and the like.

Conventional hand propelled carts are provided with rods, bars, or planks for supporting the absolute bottom of drums, garbage cans or the like. Because of this type of support, the drums or cans are not safely or steadily held on the cart, and as is often the case, the bottom lips of the containers become damaged from use so as to cause the container to tip or rock on the cart. In addition, elaborate means are sometimes used to keep the container steady on the cart during transport.

The invention overcomes the above problems by providing a circular platform for supporting the container flat bottom such that the container bottom lip depends around the top plane of the platform. A forward axle with wheels supports the platform front and a rear handle provides the cart of a three point level platform support. The bottom container lip engages the rear of the platform only and two adjustable, upstanding axle mounted braces steady the container. The platform and brace design provides flexibility in that the cart can accommodate any sized container with a bottom lip diameter greater than the platform periphery.

In one embodiment, the handle assembly is provided with a vertical fixed tube and a rod with a hook at the top telescoping in the tube and biased downward. During use, the hook overrides the container top rim to better keep the container on the platform while the cart is tilted forward for dumping the container contents.

It is therefore an object of the present invention to provide a manually operated cart which is lightweight but sturdy in construction.

It is another object of the present invention to provide a cart having a horizontally disposed circular platform mounted on a forward axle, said circular platform defining the minimum size can supported upright thereon.

It is another object of the present invention to provide two axially adjustable braces selectively positioned and secured on the axle and having cushioned upstanding ends adapted to bear against the can for bracing the same during use.

It is still another object of the present invention to provide a handle for this push or pull cart which has a foot portion extending below the plane of said platform and a hand engaging portion extending upwardly and outwardly from the rear of the platform.

It is still another object of the present invention to provide a cushion located on the upstanding handle portion, said cushion acting as a rearward limit for the supported can. The cushion and the two axially adjustable braces cooperate to define three points of the circumference of the can and thus, to define the particular diameter of the can carried by the cart.

It is yet another object of the present invention to provide a cart having wheels at the front end of a supporting platform and a handle comprising a foot portion at the back end of the platform; the handle having a top which is just below the hand location of an average standing man with his arms at his sides.

Another object is to provide a cart having the platform as described and telescoping members to positively hold the container on the platform during dumping.

Other and further features of the present invention will become apparent when taken in view of the following detailed description thereof and in view of the appended drawings in which:

FIGURE 1 is a perspective illustration of one embodiment of the cart forming the present invention;

FIGURE 2 is a front elevation of the lower portion of the cart;

FIGURE 3 is a side elevation of FIGURE 2;

FIGURE 4 is a top plan view of FIGURE 1;

FIGURE 5 is a side elevation of another embodiment of the invention; and

FIGURE 6 is a partial exploded view of the handle and container tops with parts broken away.

It is to be understood that the use of the term "can" herein is to be taken as a garbage can, drum or the like, and that "can" is used by way of example and in the non-limiting sense.

Referring to FIGURES 1-4, there is illustrated a cart 10 having a horizontally disposed platform 12 adapted to support a can in an upright position. Platform 12 comprises a circular band of steel or other suitable material, and its diameter defines the smallest size can expected to be supported and carried by cart 10.

An axle 14 is welded to the underside of forward end of platform 12 at preferably two locations A and B. Wheels 20 are rotatably secured to the ends of axle 14 in a conventional manner, for example, by bolts welded in the ends of the axle with nuts having metal caps 22 threaded thereon.

A pair of braces 24 are rigidly secured to axle 14 by the releasable locking action of bolt 26 which clamps the lower ring portion 27 to axle 14. The upper portion of the brace 24 comprises a twisted metal strap having a resilient cap 30 at the top thereof. Metal strap 28 is twisted to enable cap 30 to resiliently contact the supported can, thus bracing the same. Brace 24 is axially movable along axle 14 in the direction of the arrows seen in FIGURE 4. For axial adjustment, bolt 26 is loosened, the entire brace is moved axially along axle 14, and then bolt 26 is retightened, thus clamping the brace 24 to axle 14 at the desired position.

A handle 40 is provided to support the back side of platform 12 and enable operation of the cart. Handle 40 is composed of a hand grip 42 integral with an intermediate, outwardly extending section 44 connected to a lower vertical section 46 and a foot section 48. Foot section 48 has a forward and horizontally extending foot 50 located a predetermined distance below platform 12 so that the platform is horizontally maintained when cart 10 is resting on level ground.

A resilient cushion 52 is secured to the top of vertical section 46 and acts as a rear limit for the can supported by platform 12. Cushion 52 is preferably located in such a way that the rear can limit coincides with the rear of platform 12. See FIGURE 3.

A metal L-shaped band 54 engages the back side of vertical section 46 and has its legs welded at C and D under the rear side of platform 12. Band 54 is also welded to the back side of vertical section 46 at E.

To add additional rigidity to the construction, metal strap 60 is welded to the junction of horizontal foot 50 and the vertical section 46 and has its other end welded inside the rear of platform 12 at F.

It is preferable that the vertical position of hand grip 42 be approximately 30 inches from the floor which is just slightly below the hand position of a standing average man for reasons to be described hereinbelow.

The operation of cart 10 will now be described. A can carried by cart 10 is placed on platform 12, and the back position of the can is limited and aligned by cushion 52. The can has any desired diameter equal to or greater than the outer dimension of platform 12, but regardless of the dimension of the can, cushion 52 guides its rear depending lip contiguous to the back side of platform 12. As seen in FIGURES 3 and 4, the illustrated supported can has a diameter slightly greater than platform 12; cushion 52 causes the rear depending lip of the can to abut the rear of platform 12 but the remainder of the depending lip extends outward and beyond the outer diameter of platform 12.

Once the can is supported by platform 12, bolts 26 are loosened and braces 24 are moved axially along axle 14 until the rubber caps 30 contact the supported can. The twisted upper portion 28 of brace 24 enables maximum contact between rubber cap 30 and the can; twisted portion 28 and cap 30 also prevent can vibration from loosening ring 27 engagement with axle 14.

It can readily be seen that the diameter of the can being supported is then defined by three points on the periphery thereof, namely resilient cushion 52 and the two rubber caps 30 on braces 24. After bolts 26 are retightened and brace 24 rigidly secured in position on axle 14, the can is securely braced on the push cart and tipping is prevented.

As mentioned above, handle grip 42 is approximately 30 inches from the floor so that the operator now bends slightly, grasps handle grip 42, and when he returns to the standing position, foot 50 is raised slightly from the floor and the cart pivots around axle 14 and wheels 20. When foot 50 is off the floor, only a slight push or pull need be applied by the operator to move the entire cart and supported can forward or backward. If desired, the can can be tipped forward to any desired angle without falling from the cart because of the retaining action of the braces 24 and the rear engagement of the depending can lip and the rear portion of platform 12 (see FIGURE 3).

When removing the can, braces 24 can be rotated forward, if desired, so that rubber caps 30 disengage from the can. The can is then removed from platform 12.

In the embodiment of FIGURES 5 and 6 where like character references refer to like structure, the handle assembly includes a vertical tube 70 and top connecting bar 72 welded to tube 70 and handle 44. The top of tube 70 receives an elongated rod 74 having a finger or hook 76 at the top end to clamp the container top rim generally as shown. For this purpose, spring 78 anchored to tube 70 by pin 80 and the bottom end of rod 74 by eye piece 82 draws bar 74 downward to a normal position wherein hook 76 contacts the top 84 of tube 70. This embodiment is particularly useful for forward dumping the container which is positively held on the cart by action of the platform-lip engagement and the container-hook 76 engagement. To remove the can from the cart, rod 74 is raised and rotated so that hook 76 moves away from the can rim. Braces 24 are moved away and the can can be removed.

It should be understood that other and further modifications can be made to the herein disclosed examples of the invention without departing from the spirit and scope thereof.

What is claimed is:

1. A cart for carrying a can like object with a circular lip depending from the bottom thereof, said cart comprising a platform for supporting the bottom of the object within the periphery of the lip such that when the object is properly positioned on the cart the lip depends below the top plane of the platform, an axle connected to the forward part of the platform below the top plane thereof and extending outward beyond a part of each side of the platform, wheel means mounted at each end of the axle, a handle secured to the back of said platform and having an upper hand engageable portion extending upwardly and outwardly above the platform, limit means mounted on the handle to engage the back wall of the object when the object is properly positioned on the platform, a member connected to said platform for supporting the back part thereof, two spaced upstanding brace members each mounted on the axle between opposite ones of the wheels and the respective part of the platform side, said members extending upward to engage the forward half of the wall of the object above the object bottom when the object is properly positioned on the platform, means for releasably securing the bottom of each brace member so that its position on the axle can be changed to fit the particular sized object to be carried.

2. A cart as set forth in claim 1 wherein said platform comprises a circular ring.

3. A cart as set forth in claim 1 wherein said limit means comprises a resilient member and each brace member comprises an elongated resilient metallic strap having its upper end twisted with respect to the axle axis so that one side of the brace upper portion faces the object wall and a resilient cap mounted on the top of each brace member to contact the wall of the object.

4. A cart as set forth in claim 1 further comprising an upstanding tube rigidly connected to the handle and positioned to the rear of the platform, a rod telescoping in the top of the tube and having a hook at its upper end to engage the object top rim, and means to releasably retain the hook and object top rim engagement which in cooperation with the object bottom rim and platform engagement securely holds the object on the cart during forward tipping thereof.

5. A cart in combination with a container having a bottom, a body, and a closed, depending lip extending below said bottom, said cart comprising a platform having an outer dimension equal to or less than the inner dimension of said depending lip and having a top surface supportingly engaging said container bottom whereby said depending lip extends downward from the plane of said top surface, an axle connected under the front of said platform, a wheel rotatably mounted to each end of said axle, a handle secured to the back of said platform and having an upper hand engageable portion extending upwardly and outwardly above the platform, said handle further comprising limit means for contacting the rear of the container body, a foot member depending below said platform for supporting the back thereof, and two spaced upstanding brace members mounted on said axle for contacting the container body at two spaced points, and wherein said limit means braces the depending container lip against the rear of said platform, and wherein said limit means comprises a resilient member mounted on said handle and each of said brace members comprises an elongated steel strap having releasable clamping means at its lower end engaging said axle and having its upper end twisted with respect to the longitudinal dimension thereof so that one side of its upper portion faces the container body, and a resilient cap mounted on the top of said upper portion contacting said body.

6. A cart in combination with a container having a bottom, a body, and a closed, depending lip extending below said bottom, said cart comprising a platform having an outer dimension equal to or less than the inner dimension of said depending lip and having a top surface supportingly engaging said container bottom whereby said depending lip extends downward from the plane of said top surface, an axle connected under the front of said platform, a wheel rotatably mounted to each end of said axle, a handle secured to the back of said platform and having an upper hand engageable portion extending upwardly and outwardly above the platform, said handle further comprising limit means for contacting the rear of the container body, a foot member depending below said platform for supporting the back thereof, and two spaced upstanding brace members mounted on said axle for contacting the container body at two spaced points, and wherein said limit means braces the depending container lip against the rear of said platform, and wherein each of said brace members is axially movable on said axle and comprises an elongated steel strap having releasable clamping means at its lower end and having its upper portion twisted with respect to the longitudinal dimension thereof so that one side of its upper portion faces the supported container, and a resilient cap mounted on the top of said upper portion.

7. A cart in combination with a container having a bottom, a body and a closed depending lip extending below said bottom, said cart comprising a ring-like, circular platform having an open center and a top surface lying in a plane, said platform having an outer dimension equal to or less than the inner dimension of said depending lip, said top surface supportingly engaging said container bottom, wherein said depending lip is disposed outside said platform and extends downward from the plane of said top surface, an axle connected to two spaced locations under the front of said platform, a wheel rotatably mounted to each end of said axle, whereby the wheels and said axle support the front of said platform, a handle having a horizontally extending foot at its lower end, said foot being connected to a vertical section which extends above and below said platform, an upwardly and outwardly extending intermediate section connected to the top of said vertical section and a hand grip connected to the top of said intermediate section, said hand grip being approximately 30 inches above said foot, a first metal strap connected between said foot and the inside of the rear end of said platform, a second metal strap having two interconnecting legs, the forward edge of each leg being secured under the rear of said platform and the interconnection of said two legs being connected to the back side of said vertical section of said handle, a resilient cushion mounted in front of and near the top of said vertical section of said handle to define a rear limit for the container supported by said platform, said cushion contacting the body of said container and pressing said depending lip against the rear of said platform, two spaced upstanding brace members axially movable on said axle and releasably secured thereon, each said brace member comprising an elongated steel strap having releasable clamping means at its lower end engaging said axle and having its upper end twisted with respect to the longitudinal dimension thereof so that one side of its upper portion faces the container body, and a resilient cap mounted on the top of said upper portion contacting said body, whereby said container is supported upright and rigidly braced on said platform so that unwanted relative movements between said container and said platform are prevented.

References Cited
UNITED STATES PATENTS

| | | | |
|---|---|---|---|
| 2,818,271 | 12/1957 | Saeli | 280—79.2 |
| 2,930,561 | 3/1960 | Bittle | 280—47.26 X |
| 2,960,347 | 11/1960 | Centa | 280—47.26 |

LEO FRIAGLIA, *Primary Examiner.*

J. A. PEKAR, *Assistant Examiner.*